United States Patent
Sun

(10) Patent No.: US 9,751,810 B2
(45) Date of Patent: Sep. 5, 2017

(54) FLAME-RETARDANT AND CORROSION-RESISTANT FIBER BAMBOO SUBSTRATE AND PREPARATION METHOD THEREOF

(71) Applicants: WUXI BODA BAMBOO AND WOOD INDUSTRIAL CO., LTD. (CN), Yixing (CN); Guoqiang Sun, Yixing (CN)

(72) Inventor: Guoqiang Sun, Yixing (CN)

(73) Assignee: WUXI BODA BAMBOO AND WOOD INDUSTRIAL CO., LTD., Yinxing (CN)

( * ) Notice: Subject to any disclaimer, the term of this patent is extended or adjusted under 35 U.S.C. 154(b) by 0 days.

(21) Appl. No.: 13/985,258

(22) PCT Filed: Jul. 19, 2013

(86) PCT No.: PCT/CN2013/079711
§ 371 (c)(1),
(2) Date: Aug. 22, 2014

(87) PCT Pub. No.: WO2014/019458
PCT Pub. Date: Feb. 6, 2014

(65) Prior Publication Data
US 2015/0128827 A1 May 14, 2015

(30) Foreign Application Priority Data

Jul. 30, 2012 (CN) .......................... 2012 1 0268180

(51) Int. Cl.
| | |
|---|---|
| C04B 35/64 | (2006.01) |
| C04B 35/83 | (2006.01) |
| B27N 3/18 | (2006.01) |
| B27N 9/00 | (2006.01) |
| C09K 21/14 | (2006.01) |
| B27M 1/02 | (2006.01) |
| B27M 1/06 | (2006.01) |
| B27M 1/08 | (2006.01) |
| B32B 9/02 | (2006.01) |
| B27K 3/02 | (2006.01) |
| B27K 3/16 | (2006.01) |
| B27K 3/34 | (2006.01) |
| B27K 5/00 | (2006.01) |

(52) U.S. Cl.
CPC ............... *C04B 35/64* (2013.01); *B27K 3/02* (2013.01); *B27M 1/02* (2013.01); *B27M 1/06* (2013.01); *B27M 1/08* (2013.01); *B27N 3/18* (2013.01); *B27N 9/00* (2013.01); *B32B 9/02* (2013.01); *C04B 35/83* (2013.01); *C09K 21/14* (2013.01); *B27K 3/0278* (2013.01); *B27K 3/163* (2013.01); *B27K 3/34* (2013.01); *B27K 5/009* (2013.01); *B27K 2240/30* (2013.01); *B32B 2260/021* (2013.01); *B32B 2260/04* (2013.01); *B32B 2262/065* (2013.01)

(58) Field of Classification Search
None
See application file for complete search history.

(56) References Cited

FOREIGN PATENT DOCUMENTS

| CN | 101301767 A | * 11/2008 |
|---|---|---|
| CN | 102275200 A | * 12/2011 |

OTHER PUBLICATIONS

Written Opinon of PCT/CN2013/079711, Oct. 24, 2013.*
Machine translation of CN 102275200 A, Jul. 26, 2016.*
Machine translation of CN 101301767 A, Jul. 26, 2016.*
Gao, Ming, Shousheng Yang, and Rongjie Yang. "Flame retardant synergism of GUP and boric acid by cone calorimetry." Journal of applied polymer science 102.6 (Sep. 28, 2006): 5522-5527.*
Human translation of CN-101301767-A, Jul. 2016.*
Human translation of CN-102275200-A, Jul. 2016.*

* cited by examiner

*Primary Examiner* — Benjamin Schiffman
(74) *Attorney, Agent, or Firm* — Zareefa B. Flener; Flener IP Law

(57) ABSTRACT

The invention claims a flame-retardant and corrosion-resistant fiber bamboo substrate and a preparation method thereof. The preparation method comprises the following steps of: 1) cutting raw bamboo into bamboo filaments; 2) flame-retardant treatment: soaking the bamboo filaments prepared in Step 1) in aqueous solution of a flame retardant; 3) drying: drying the flame-retardant treated bamboo filaments at 55° C. to 65° C. until the absolute water content is not more than 12%; 4) carbonized pyrolysis: feeding the dried bamboo filaments into a carbonized pyrolysis kiln, to be high-temperature treated according to a pyrolysis gradient; and, 5) sequentially gumming, post-gumming drying, pressing, curing, maintaining and splitting to obtain a bamboo substrate. The bamboo substrate has high stability, no cracks on the product surface, enhanced corrosion resistance and excellent flame retardance, and may be used in various climate conditions and environments.

3 Claims, No Drawings

# FLAME-RETARDANT AND CORROSION-RESISTANT FIBER BAMBOO SUBSTRATE AND PREPARATION METHOD THEREOF

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA EFS-WEB

Not Applicable

STATEMENT REGARDING PRIOR DISCLOSURES BY THE INVENTOR OR A JOING INVENTOR

Not Applicable

BACKGROUND OF THE INVENTION

As the second forest resource in China, bamboo has a yield of about 1/10 of that of wood, and is rich and concentrated. Bamboo is a renewable resource, and the sustainable use thereof may be possible due to proper management once a bamboo forest is formed. With high growth speed and short growth period, bamboos that have grown for 3 to 5 years may be harvested. Generally, bamboos for manufacturing bamboo floorings are those that have grown for 5 to 8 years. China has been facing the supply-demand imbalance of wood over the years, so substituting wood with bamboo provides a good opportunity for developing and processing abundant bamboos into bamboo floorings. Bamboo products have been widely applied in daily life. The process for preparing a bamboo substrate is as follows: sawing off of raw bamboo, splitting, combing and pressing, wet carbonizing, drying, gumming, post-gumming drying, pressing and curing, maintaining and splitting. The existing process has the following technical problems. (1) When combed and pressed, the green surface and yellow surface of bamboo sheets have to be removed and knots thereof have to be bored. Due to the respective radian of surfaces of the bamboo sheets, a part of useful bamboo may be scraped away during removing of the green surface and the yellow surface and boring of knots, thereby resulting in waste. (2) As bamboo itself has good flammability and is more likely to burn than wood, bamboo substrates are likely to cause fire while in service. (3) As wet carbonization (steam carbonization) is usually employed for the existing carbonization of bamboo fibers and the activity of bamboo fiber tubes is not completely removed, so moisture expansion may be caused, as a result, the prepared substrates have poor stability. When tested by a method applicable for outdoor products, substrates produced by conventional processes expand and crack seriously after cooked for 2 h. The existing carbonization processes fail to completely release the internal stress of the substrates, so surfaces of the substrates will have small cracks when used over a period of time. As active substances of the bamboo fiber tubes are completely removed, nutrients are provided for decay fungi. The bamboo fiber tubes are likely to mildew under wet conditions, with poor corrosion resistance. Furthermore, during the wet carbonization, it is likely to produce waste gas and water, thereby causing pollution to the environment and energy waste.

(1) Field of the Invention

The invention belongs to the field of bamboo products, in particular to a flame-retardant and corrosion-resistant fiber bamboo substrate and a preparation method thereof.

(2) Description of Related Art Including Information Disclosed Under 37 CFR 1.97 and 1.98

Not Applicable

BRIEF SUMMARY OF THE INVENTION

One purpose of the invention is to provide a flame-retardant and corrosion-resistant fiber bamboo substrate.

Another purpose of the invention is to provide a method for preparing a flame-retardant and corrosion-resistant fiber bamboo substrate.

The purposes of the invention may be implemented by the following technical solutions.

A flame-retardant and corrosion-resistant fiber bamboo substrate is provided, the preparation method of which comprises the following steps of:

1) cutting raw bamboo into bamboo filaments;
2) flame-retardant treatment: soaking the bamboo filaments prepared in Step 1) in aqueous solution of a flame retardant;
3) drying: drying the flame-retardant treated bamboo filaments at 55° C. to 65° C. until the absolute water content is not more than 12%;
4) carbonized pyrolysis: feeding the dried bamboo filaments into a carbonized pyrolysis kiln, to be high-temperature treated according to a pyrolysis gradient, the pyrolysis gradient being as follows: heating the dried bamboo filaments to 100° C. to 120° C. within 280 min to 320 min and then keeping the temperature unchanged at 100° C. to 120° C. for 40 min to 80 min, heating to 180° C. to 230° C. from 100° C. to 120° C. with 200 min to 240 min, and then keeping the temperature unchanged at 180° C. to 230° C. for 220 min to 260 min; and,
5) sequentially gumming, post-gumming drying, pressing, curing, maintaining and splitting to obtain a bamboo substrate.

The flame-retardant and corrosion-resistant fiber bamboo substrate is characterized in that the process of cutting raw bamboo into bamboo filaments in Step 1) is as follows: sawing off the raw bamboo, splitting, flattening, removing the green surface, removing the yellow surface, knot boring, combing and pressing to obtain bamboo filaments.

The flame-retardant and corrosion-resistant fiber bamboo substrate is characterized in that the pyrolysis gradient as described in Step 4) is preferably as follows: heating the dried bamboo filaments to 110° C. within 300 min and then keeping the temperature unchanged at 110° C. for 60 min, heating to 190° C. from 110° C. with 200 min, and then keeping the temperature unchanged at 190° C. for 240 min.

The flame-retardant and corrosion-resistant fiber bamboo substrate is characterized in that the mass concentration of the aqueous solution of flame retardant by percentage as described in Step 2) is 10% to 15%, and the major components of the flame retardant are $OHCH_2HNC(NH_2)NHCONH_2 \cdot H_2PO_4$ and $H_3BO_3$.

The flame-retardant and corrosion-resistant fiber bamboo substrate is characterized in that the gumming process as described in Step 5) is as follows: after soaking the bamboo filaments treated by carbonized pyrolysis in Step 4) in aqueous solution of phenolic glue, taking the bamboo filaments out, and drying; the aqueous solution of phenolic glue is prepared from phenol glue and water at the mass ratio of 1:1-1.5; and the carbonized pyrolysis kiln as described in Step 4) is heated by an electric heater or a heat transfer oil heater.

A method for preparing a flame-retardant and corrosion-resistant fiber bamboo substrate is provided, comprising the following steps of:

1) cutting raw bamboo into bamboo filaments;

2) flame-retardant treatment: soaking the bamboo filaments prepared in Step 1) in aqueous solution of a flame retardant;

3) drying: drying the flame-retardant treated bamboo filaments at 55° C. to 65° C. until the absolute water content is not more than 12%;

4) carbonized pyrolysis: feeding the dried bamboo filaments into a carbonized pyrolysis kiln, to be high-temperature treated according to a pyrolysis gradient, the pyrolysis gradient being as follows: heating the dried bamboo filaments to 100° C. to 120° C. within 280 min to 320 min and then keeping the temperature unchanged at 100° C. to 120° C. for 40 min to 80 min, heating to 180° C. to 230° C. from 100° C. to 120° C. with 200 min to 240 min, and then keeping the temperature unchanged at 180° C. to 230° C. for 220 min to 260 min; and, 5) sequentially gumming, post-gumming drying, pressing, curing, maintaining and splitting to obtain a bamboo substrate. Processes of gumming, post-gumming drying, pressing, curing, maintaining and splitting are the same as those in the prior art.

The method for preparing a flame-retardant and corrosion-resistant fiber bamboo substrate is characterized in that the process of cutting raw bamboo into bamboo filaments in Step 1) is as follows: sawing off the raw bamboo, splitting, flattening, removing the green surface, removing the yellow surface, knot boring, combing and pressing to obtain bamboo filaments.

The method for preparing a flame-retardant and corrosion-resistant fiber bamboo substrate is characterized in that the pyrolysis gradient as described in Step 4) is as follows: heating the dried bamboo filaments to 110° C. within 300 min and then keeping the temperature unchanged at 110° C. for 60 min, heating to 190° C. from 110° C. with 200 min, and then keeping the temperature unchanged at 190° C. for 240 min.

The method for preparing a flame-retardant and corrosion-resistant fiber bamboo substrate is characterized in that the mass concentration of the aqueous solution of flame retardant by percentage as described in Step 2) is 10% to 15%, and the major components of the flame retardant are OHCH2HNC(NH2)NHCONH2.H2PO4 and H3BO3.

The method for preparing a flame-retardant and corrosion-resistant fiber bamboo substrate is characterized in that the gumming process as described in Step 5) is as follows: after soaking the bamboo filaments treated by carbonized pyrolysis in Step 4) in aqueous solution of phenolic glue, taking the bamboo filaments out and drying; the aqueous solution of phenolic glue is prepared from phenol glue and water at the mass ratio of 1:1-1.5; and the carbonized pyrolysis kiln in Step 4) is heated by an electric heater or a heat transfer oil heater.

In the invention, the raw bamboo is cut off, split, flattened, removed the green surface, the yellow surface and knots off, combed, and pressed to obtain bamboo filaments. The bamboo filaments are flame-retardant treated and dried, then fed into the carbonized pyrolysis kiln, and carbonized by the high-temperature carbonization process, to obtain qualified bamboo filaments as raw material for producing the bamboo substrate. Then, blanks for producing floorings are prepared by a series of processes, such as gumming, post-gumming drying, pressing, curing, maintaining and splitting. In the carbonized pyrolysis kiln, a conventional electric heater or heat transfer oil heater is adopted for heating. Water in the bamboo filaments is further discharged during the carbonized pyrolysis, so that the stability of the substrate is enhanced.

BRIEF DESCRIPTION OF SEVERAL VIEWS OF THE DRAWINGS

Not Applicable

DETAILED DESCRIPTION OF THE INVENTION

Bamboo sheets are flattened before removed the green surface, the yellow surface and knot off, thereby enhancing the utilization of bamboo. The carbonization process employed in the invention abandons the process of directly feeding steam for carbonization as used in the prior art. Instead, an electric heater or a heat transfer oil heater is adopted for heating and carbonization according to the pyrolysis gradient provided in the invention, so that the carbonized pyrolysis effect of the bamboo filaments is more remarkable.

Advantage #1: Good Stability of Products

The bamboo filament pressing process of the new products makes the utilization of bamboo higher. The bamboo filament fibers crushed from the bamboo sheets are finer, thereby improving the permeability of glue; without damaging the transverse cross-linking between the bamboo filaments. The bamboo filaments form a netty cross-linking structure after pressed. In addition, as the activity of the fiber tubes of the bamboo filaments are removed by the high-temperature carbonization process in the invention, the internal stress in bamboo is reduced, thereby improving the stability of the substrate. The test results show that bamboo substrates produced by the new method have a moisture expansibility of below 10% when tested by a method applicable for outdoor products (boiling for 4 h, then drying at 63° C. for 20 h, and boiling for 4 h again). Materials produced by conventional processes expand and crack seriously after boiled for 2 h.

Advantage #2: No Cracks on Surfaces of Products

The activity of the fiber tubes of conventional products is not removed, so the internal stress still exists. As the internal stress is not completely released, the conventional products may have small cracks on the surfaces more or less after used over a period of time, i.e. the called surface cracks. As the new products are high-temperature carbonized, the activity of bamboo is removed completely and the internal stress of bamboo is greatly reduced. Furthermore, the bamboo filaments for the new products are finer than those for the conventional products, so the pressed floorings will not have cracks at all.

Advantage #3: Enhanced Corrosion Resistance

During drying and carbonization, the internal components of bamboo undergo complicated chemical changes. This changes some components of bamboo and reduces nutrients for decay fungi, so the possibility for the growth of fungi in bamboo is reduced in the food chain. Meanwhile, chemical reactions occurring in bamboo produce some substances that can inhabit decay fungi, so the generation of decay fungi may be inhabited. Therefore, the corrosion resistance of the dried and carbonized bamboo is enhanced.

Advantage #4: Applicability in Various Climate Conditions and Environments

As the new products have good stability and corrosion resistance, and low moisture expansibility, the products have broader application fields. The new products may be suitable for humid environments, and may also be used as geothermal floorings.

Advantage #5: Features of Repeated Polishing, Recoating and Reusing

A process of surface coloring is generally employed to make the conventional products reach the color of new products. It is very difficult to repair a painted surface if it is damaged when in service. However, the new products have only one color from inside to outside; and the surface of the new products almost has no pores and gaps, and is very delicate and smooth. Therefore, it is very convenient for re-polishing and painting the surface of the new products to achieve an ideal effect of reuse, with no large scale repair required.

Advantage #6: Excellent Flame Retardance

The additional use of a flame retardant during the pressing of new products may achieve excellent fireproof and flame-retardant effects.

Advantage #7: Elegant Appearance

As one-time carbonization is employed for coloring, the pressed material has natural texture on the surface. In addition, the surface of the new products is very delicate. With yellowish black texture, the new products look noble.

Advantage #8: More Environmentally Friendly

Instead of wet carbonization for the conventional products, dry carbonization is employed for the new product during the treatment of bamboo filaments, without any chemical reagents. Therefore, no waste gas and water will be caused, and no influence will be caused to the local environment.

Therefore, the finished products may be directly provided to users, and may also be used as novel materials to be further manufactured to other various artificial boards. The subsequent processing procedures are the same as those for bamboo floorings.

Embodiment Process raw bamboo: sawing off, splitting, flattening, removing the green surface, removing the yellow surface, knot boring, combing and pressing; flame-retardant treatment; drying; carbonized pyrolysis; gumming; post-gumming drying; pressing and curing; maintaining; and splitting.

1) Sawing off: sawing the raw bamboo into bamboo tubes 1950 mm to 2500 mm in length according to the desired length of the product.

Splitting: splitting the sawn raw bamboo into bamboo strips 15 mm to 22 mm in width by a bamboo-splitting machine.

Combing and pressing: flattening, removing the green surface, removing the yellow surface, boring knots, combing and pressing the bamboo strips by a dedicated equipment (Fujian Jianyang Sanhe Machinery Manufacturing Co., Ltd., model: PZ300) to obtain flattened bamboo filaments 30 mm to 40 mm in width, 4 mm to 6 mm in thickness, 1950 mm to 2500 mm in length and 1.5 mm to 3 mm in diameter.

2) Flame-retardant treatment: preparing a flame retardant (available in market, main components: $OHCH_2HNC(NH_2)NHCONH_2.H_2PO_4$ and $H_3BO_3$) into aqueous solution of flame retardant with a mass concentration by percentage of 12%, soaking the combed bamboo filaments into the aqueous solution of flame retardant for 15 min. With advantages of high flame retardance, easy penetration, leachibility, no hygroscopy, no white permeability, smoke suppression, mildew proof, etc, the flame retardant is a water-based non-halogen environmentally-friendly composite flame retardant meeting the GA159-1997 standard.

3) Drying: putting the flame-retardant treated bamboo filaments in a drying chamber to be dried at 55° C. to 65° C. until the absolute water content of the dried bamboo filaments is 10% to 12%.

4) Carbonized pyrolysis: loading the dried bamboo filaments in a trolley and then feeding them into a carbonized pyrolysis kiln to be high-temperature carbonized treatment according to a set pyrolysis gradient to obtain qualified raw material. The pyrolysis gradient is as follows: heating the dried bamboo filaments to 110° C. within 300 min and then keeping the temperature unchanged at 110° C. for 60 min, heating to 190° C. from 110° C. with 200 min, and then keeping the temperature unchanged at 190° C. for 240 min.

5) Gumming: soaking the bamboo filaments treated by carbonized pyrolysis in the aqueous solution of phenolic glue (prepared from phenolic glue and water in a mass ratio of 1:1.2), taking the bamboo filaments out 10 min later, and air-drying.

6) Post-gumming drying: drying the gummed and air-dried bamboo filaments by a mesh-belt drier until the absolute water content is 12% to 15%.

7) Pressing: pressing the post-gumming dried bamboo filaments into a square stock by a 2500 t press via a special mould.

Curing: placing the pressed square stock into a curing kiln to be cured for 12 h at 90° C. to 135° C. until the glue is completely cured.

8) Maintaining: stacking the cured square stock for more than 15 days until the stress of the square stock is completely released.

9) Splitting: splitting the maintained square stock according to the desired specifications of the finished product.

Performance tests on all aspects of the flame-retardant and corrosion-resistant fiber bamboo substrate prepared by Embodiment Process:

1. Good Stability of Products

The products produced by the new method have a moisture expansibility of below 10% when tested by a method applicable for outdoor products (boiling for 4 h, then drying at 63° C. for 20 h, and boiling for 4 h again). Materials produced by conventional processes expand and crack seriously after boiled for 2 h.

2. No Cracks on Surfaces of Products

As the internal stress of the conventional products is not completely released, the conventional products may have small cracks on the surfaces more or less after used over a period of time, i.e. the called surface cracks. As the new products are high-temperature carbonized, the activity of bamboo is removed completely and the internal stress of bamboo is greatly reduced. Furthermore, the bamboo filaments for the new products are finer than those for the conventional products, so the pressed floorings will not have cracks at all.

3. Enhanced Corrosion Resistance

During drying and carbonization, the internal components of bamboo undergo complicated chemical changes. This changes some components of bamboo and reduces nutrients for decay fungi, so the possibility for the growth of fungi in bamboo is reduced in the food chain. Meanwhile, chemical reactions occurring in bamboo produce some substances that can inhabit decay fungi, so the generation of decay fungi may be inhabited. Therefore, the corrosion resistance of the dried and carbonized bamboo is enhanced.

4. Applicability in Various Climate Conditions and Environments

As the new products have good stability and corrosion resistance, and low moisture expansibility, the products have broader application fields. The new products may be suitable for humid environments, and may also be used as geothermal floorings.

5. Features of Repeated Polishing, Recoating and Reusing

A process of surface coloring is generally employed to make the conventional products reach the color of new products. It is very difficult to repair a painted surface if it is damaged when in service. However, the new products have only one color from inside to outside; and the surface of the new products almost has no pores and gaps, and is very delicate and smooth. Therefore, it is very convenient for re-polishing and painting the surface of the new products to achieve an ideal effect of reuse, with no large scale repair required.

6. Excellent Flame Retardance

The additional use of a flame retardant during the pressing of new products may achieve excellent fireproof and flame-retardant effects. The results of combustion performance tests are as shown in Table 1.

TABLE 1

Results of Combustion Performance Tests of a Flame-retardant and Corrosion-resistant Fiber Bamboo Substrate

| Items | Method | Index | Result | Conclusion |
|---|---|---|---|---|
| Loss ratio of bending strength | GB/T 1935-91 | ≤35 | 3 | Qualified |
| Minimum residual length after combustion, mm | GB/T8625-2006 | >0 | 170 | Qualified |
| Average residual length after combustion, mm | GB/T8625-2005 | ≥150 | 204 | Qualified |
| Average smoke peak value during combustion, ° C. | GB/T8625-2005 | ≤200 | 144 | Qualified |
| Smoke density rating during combustion (SDR) | GB/T8625-007 | ≤75 | 24 | Qualified |

The invention claimed is:

1. A process for preparing a flame-retardant and corrosion-resistant fiber bamboo substrate, comprising the following steps of:
   1) cutting raw bamboo into bamboo filaments;
   2) soaking the bamboo filaments prepared in Step 1) in aqueous solution of flame retardant;
   3) drying: drying the flame-retardant treated bamboo filaments at 55° C. to 65° C. until the absolute water content is less than 12%;
   4) carbonized pyrolysis: feeding the dried bamboo filaments from step 3) into a carbonized pyrolysis kiln, to be high-temperature treated according to a pyrolysis gradient, the pyrolysis gradient being as follows: heating the dried bamboo filaments to 110° C. within between 120 min and 300 min and then keeping the temperature unchanged at 110° C. for 60 min, heating to 190° C. from 110° C. within 200 min, and then keeping the temperature unchanged at 190° C. for 240 min; and, the carbonized pyrolysis kiln being heated by an electric heater or a heat transfer oil heater without feeding of steam or gas into the carbonized pyrolysis kiln; and
   5) sequentially gumming, post-gumming drying, pressing, curing, and splitting to obtain a bamboo substrate, the gumming process being as follows: soaking the bamboo filaments treated by carbonized pyrolysis in Step 4), without a moisturization step or a drying step between Step 4 and 5 to adjust the absolute water content of the bamboo filaments, in aqueous solution of phenolic glue, taking the bamboo filaments out and drying; and the aqueous solution of phenolic glue being prepared from phenol glue and water at the mass ratio of 1:1-1.5.

2. The process for preparing a flame-retardant and corrosion-resistant fiber bamboo substrate according to claim 1, characterized in that the process of cutting raw bamboo into bamboo filaments in Step 1) is as follows: sawing off the raw bamboo, splitting, flattening, removing the green surface, removing the yellow surface, knot boring, combing and pressing to obtain bamboo filaments.

3. The process for preparing a flame-retardant and corrosion-resistant fiber bamboo substrate according to claim 1, characterized in that, in Step 2), the mass concentration of the aqueous solution of flame retardant by percentage is 10% to 15%, and the flame retardant consists essentially of $OHCH_2HNC(NH_2)NHCONH_2 \cdot H_2PO_4$ and $H_3BO_3$.

* * * * *